3,301,894
S-[N'-(CHLOROCARBONYL) - AMINO]ISOTHIOCAR-BAMYL CHLORIDES AND THEIR PREPARATION
Gerhard F. Ottmann, Hamden, and Haywood Hooks, Jr., West Haven, Conn., assignors to Olin Mathieson Chemical Corporation, New Haven, Conn., a corporation of Virginia
No Drawing. Filed Nov. 16, 1964, Ser. No. 411,638
12 Claims. (Cl. 260—544)

This invention relates to a process for preparing S-[N'-(chlorocarbonyl) - amino] isothiocarbamyl chlorides. More particularly it relates to the preparation of a series of compounds having the following general formula:

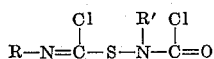

wherein R and R' are either alkyl, cycloalkyl, aryl, substituted aryl, or benzyl.

It has recently been established that S-chloro isothiocarbamyl chlorides are provided by the reaction of various isothiocyanates with a substantially equivalent amount of chlorine at low reaction temperatures in the presence of an inert solvent. The reactions proceed as illustrated in the following equation wherein, for example, N-phenyl S-chloro isothiocarbamyl chloride is prepared by adding chlorine to phenyl isothiocyanate:

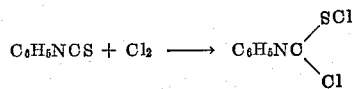

A more thorough and general description of the preparation of these derivatives is disclosed in our copending U.S. patent applications, Serial No. 354,789, filed March 25, 1964, and Serial No. 370,051, filed May 25, 1964.

The resulting S-chloro isothiocarbamyl chlorides are somewhat sensitive to heat and moisture, but they are surprisingly stable if handled properly. It has now been found that these chlorides can be reacted with a wide variety of isocyanates to provide S-[N'-(chlorocarbonyl)-amino] isothiocarbamyl chlorides having the general Formula I. An efficient and convenient process for the preparation of the derivatives I) in high yield and purity is disclosed herein.

Although a great number of S-chloro isothiocarbamyl chlorides having the formula RNC(Cl)SCl may be employed as reactants in the practice of this invention, it is preferred to utilize certain of these derivatives. Thus, particularly suitable reactants are those S-chloro isothiocarbamyl chlorides wherein R is alkyl having 1–18 carbon atoms, cycloalkyl having 5–7 carbon atoms such as cyclohexyl, aryl having 6–10 carbon atoms including phenyl, tolyl and xylyl, phenyl having a lower alkoxy (1–3 carbon atoms) substituent, halogenated phenyl, nitrated phenyl, and benzyl. The preparation of these preferred S-chloro isothiocarbamyl chlorides and other is disclosed in the aforementioned copending U.S. patent applications.

Similarly, many isocyanates can be utilized as reactants with the S-chloro isothiocarbamy chlorides to provide derivatives having the Formula I, but certain isocyanates are particularly suitable for use in the process of this invention. Thus, isocyanates R'NCO wherein R' is alkyl having 1–18 carbon atoms, cycloalkyl having 5–7 carbon atoms, aryl having 6–10 carbon atoms, halogenated phenyl, nitrated phenyl, and phenyl having a lower alkoxy (1–3 carbon atoms) substituent are preferentially utilized in the practice of this invention.

For instance, included among the isocyanates which may be employed in the preparation of the compounds (I) are methyl, ethyl, n-propyl, isopropyl, n-butyl, isobutyl, n-hexyl, 3-hexyl, n-heptyl, 4-heptyl, n-octyl, 2-ethylhexyl, n-decyl, 4-butyloctyl, octadecyl, cyclopentyl, cyclohexyl, cycleheptyl, phenyl, o-tolyl, m-tolyl, p-tolyl, 2,6-xylyl, 1-naphthyl, 2-naphthyl, 2-chlorophenyl, 3-chlorophenyl, 4-chlorophenyl, 4-bromophenyl, 3-bromotolyl, 4-fluorophenyl, 2,4-dibromophenyl, 3,4-dichlorophenyl, 2,5-dichlorophenyl, 2-nitrophenyl, 3-nitrophenyl, 4-nitrophenyl, 2,4-dinitrophenyl, 3,5-dinitrophenyl, 2,4,6-trinitrophenyl, 3-methoxyphenyl, 4-methoxyphenyl, p-ethoxyphenyl, phenethyl, benzyl, and m-methoxybenzyl isocyanates.

The S - [N' - (chlorocarbonyl)-amino] isothiocarbamyl chlorides of this invention are readily prepared by reacting the isocyanates with the S-chloro isothiocarbamyl chlorides in the presence of an inert diluent. Included among the diluents which are suitable for use in the process are ether, various aromatics such as benzene and toluene, aliphatic hydrocarbons such as hexane, heptane, and chlorinated hydrocarbons as, for example, carbon tetrachloride.

The process of this invention is carried out preferentially at a reaction temperature range of about 0° C. to about 60° C. and even more optimally at a range of about 15°–30° C.

The products can be isolated at the completion of the reaction period by conventional procedures such as filtration, etc. They may also be isolated by merely stripping the diluent employed from the reaction mixture to obtain the residual product.

The following examples will serve to illustrate the preparation of several of the S-[N'-(chlorocarbonyl)-amino] isothiocarbamyl chlorides (I) in accordance with this invention.

*Example 1*

To a solution of 24.0 g. of ethyl isocyanate in 150 ml. of ether was added an amount of 70.0 g. of N-phenyl S-chloro isothiocarbamyl chloride dropwise and with stirring. The slightly exothermic reaction was controlled at a temperature of between 20° and 25° C. by means of an external cooling bath of 15 °C. After complete addition, the reaction mixture was stirred for 16 more hours at room temperature. During this period a white precipitate had formed which was separated by filtration, washed with dry pentane, and dried in vacuo affording 85.0 g. (91% of the theory) of N-phenyl S-[N'-chlorocarbonyl)-ethylamino] isothiocarbamyl chloride, M.P. 108°–109° C., in the form of a white microcrystalline solid.

*Analysis.*—Calcd. for $C_{10}H_{10}Cl_2N_2OS$: N. 10.10; S, 11.54. Found: N, 10.06; S, 12.01.

*Example 2*

A total of 75.0 g. of N-phenyl S-chloro isothiocarbamyl chloride was added dropwise to a stirred solution of 48.0 g. of p-tolyl isocyanate in 200 ml. of ether. A temperature of 25° to 30° C. was maintained throughout the reaction. After standing for 16 additional hours the white precipitate which had formed during the reaction was removed by filtration, washed with dry ether and dry pentane, and dried in vacuo affording 103 g. (84% of the theory) of N-phenyl S-[N'-(chlorocarbonyl)-p-tolylamino] isothiocarbamyl chloride in the form of a white solid, M.P. 95°–96° C.

*Analysis.*—Calcd. for $C_{15}H_{12}Cl_2N_2OS$: N, 8.25; S, 9.43. Found: N, 8.04; S, 9.38. Molecular weight: Calcd. 339.3; found 337.

*Example 3*

An amount of 68.0 g. of N-butyl S-chloro isothiocarbamyl chloride was added dropwise to a stirred solution of 40.0 g. of butyl isocyanate in 500 ml. ether within a period of 45 minutes. The reaction was exothermic, and a precipitate started to appear after approximately 10 g. of the chloride had been added. The reaction temperature was maintained between 20° and 30° C. After complete addition, the mixture was stirred for 5 additional hours. Then the precipitate was removed by filtration, washed with ether and pentane and dried in vacuo to provide 88.0 g. (85% of the theory) of N-butyl S-[N'-(chlorocarbonyl)-butylamino] isothiocarbamyl chloride, M.P. 133°–134° C., in the form of a microcrystalline powder.

*Analysis.*—Calcd. for $C_{10}H_{18}Cl_2N_2OS$: C, 42.09; H, 6.32; S, 11.21. Found: C, 42.86; H, 6.35; S, 11.56.

*Examples 4–11*

Using a procedure similar to that utilized in the above examples, a number of other derivatives having the general Formula I have also been prepared. Several of the additional S-[N'-(chlorocarbonyl)-amino] isothiocarbamyl chlorides thus prepared are listed in the following table.

TABLE I

| Reactants | Chloride Prepared Having General Formula (I) | | M.P., ° C. | Yield, Percent |
|---|---|---|---|---|
| N-phenyl S-chloro isothiocarbamyl chloride-isopropyl isocyanate. | R=phenyl | R'=isopropyl | 101–102 | 77 |
| N-phenyl S-chloro isothiocarbamyl chloride-butyl isocyanate. | R=phenyl | R'=butyl | 97–99 | 86 |
| N-phenyl S-chloro isothiocarbamyl chloride-octyl isocyanate. | R=phenyl | R'=octyl | 92–93 | 68 |
| N-phenyl S-chloro isothiocarbamyl chloride-phenyl isocyanate. | R=phenyl | R'=phenyl | 74–75 | 80 |
| N-phenyl S-chloro isothiocarbamyl chloride-p-chlorophenyl isocyanate. | R=phenyl | R'=p-chlorophenyl | 113–114 | 80–90 |
| N-phenyl S-chloro isothiocarbamyl chloride-p-methoxyphenyl isocyanate. | R=phenyl | R'=p-methoxyphenyl | 85–87 | ~100 |
| N-ethyl S-chloro isothiocarbamyl chloride-octyl isocyanate. | R=ethyl | R'=octyl | 132–133 | 78 |
| N-cyclohexyl S-chloro isothiocarbamyl chloride-isopropyl isocyanate. | R=cyclohexyl | R'=isopropyl | 131 | 60 |

The S-[N'-(chlorocarbonyl)-amino] isothiocarbamyl chlorides of this invention are useful as cross linking and chain extending agents in various resin formulations. They are particularly valuable in this regard when used in the preparation of polyurethane and polyamide resins due to the high reactivity of the chlorine atoms with the active hydrogen atoms in the beginning formulations.

They are also valuable intermediates in the preparation of a series of cyclic compounds which are useful agricultural chemicals. It has been found that the compounds (I) react with water to provide derivatives of 1,3,4-oxathiazolidinone having herbicidal and nematocidal properties. For example, N-phenyl S-[N'-(chlorocarbonyl)-ethylamino] isothiocarbamyl chloride reacts with water at room temperature to provide a nearly quantitative yield of 2 - phenylimino - 4 - ethyl - 1,3,4-oxathiazolidin-5-one which is an effective nematocide and herbicide.

What is claimed is:

1. Compounds having the formula

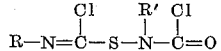

wherein both R and R' are independently selected from the class consisting of alkyl having 1–18 carbon atoms, cycloalkyl having 5–7 carbon atoms, aryl having 6–10 carbon atoms, halogenated phenyl, nitrated phenyl, benzyl and phenyl having a lower alkoxy substituent.

2. The compounds of claim 1 wherein R and R' are each alkyl having 1–18 carbon atoms.

3. The compounds of claim 1 wherein R and R' are each aryl having 6–10 carbon atoms.

4. The compounds of claim 1 wherein R is aryl having 6–10 carbon atoms and R' is alkyl having 1–18 carbon atoms.

5. The compounds of claim 1 wherein R is alkyl having 1–18 carbon atoms and R' is aryl having 6–10 carbon atoms.

6. Compounds having the formula

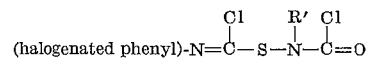

R' being alkyl having 1–18 carbon atoms.

7. The compounds of claim 6 wherein R' is aryl having 6–10 carbon atoms.

8. Compounds having the formula

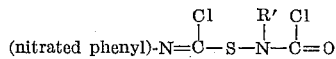

R' being alkyl having 1–18 carbon atoms.

9. The compounds of claim 8 wherein R' is aryl having 6–10 carbon atoms.

10. Compounds having the formula

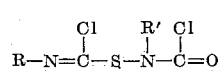

R being aryl having 6–10 carbon atoms and R' being halogenated phenyl.

11. A process for preparing S-[N'-(chlorocarbonyl)-amino] isothiocarbamyl chlorides which comprises reacting a compound having the formula

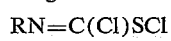

with an isocyanate of the Formula R'NCO in the presence of an inert diluent, R and R' being independently selected from the class consisting of alkyl having 1–18 carbon atoms, cycloalkyl having 5–7 carbon atoms, aryl having 6–10 carbon atoms, halogenated phenyl, nitrated phenyl, benzyl and phenyl having a lower alkoxy substituent.

12. The process of claim 11 wherein a reaction temperature range of about 0° C. to about 60° C. is utilized.

No references cited.

LORRAINE A. WEINBERGER, *Primary Examiner.*

R. JACKSON, *Assistant Examiner.*